UNITED STATES PATENT OFFICE.

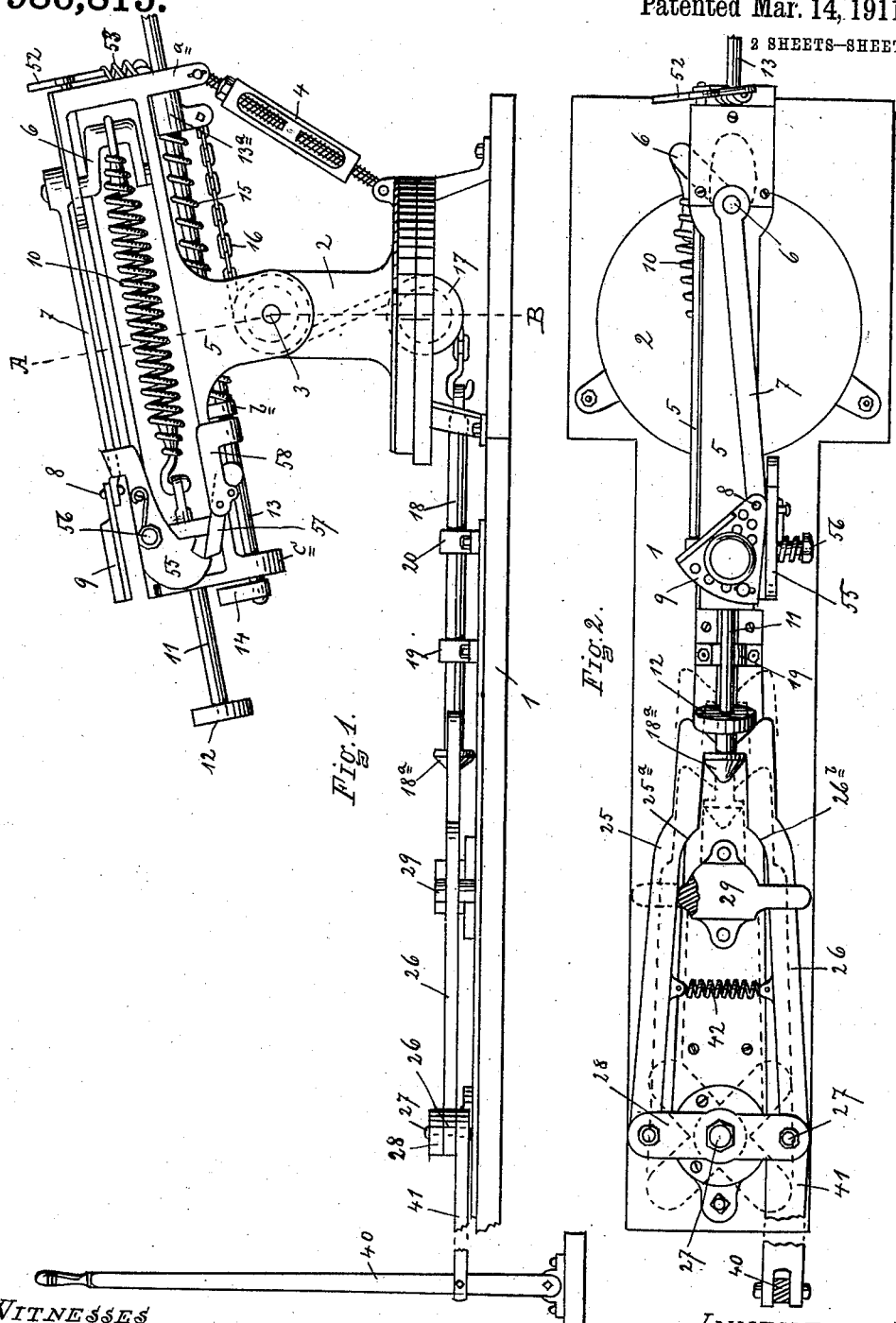

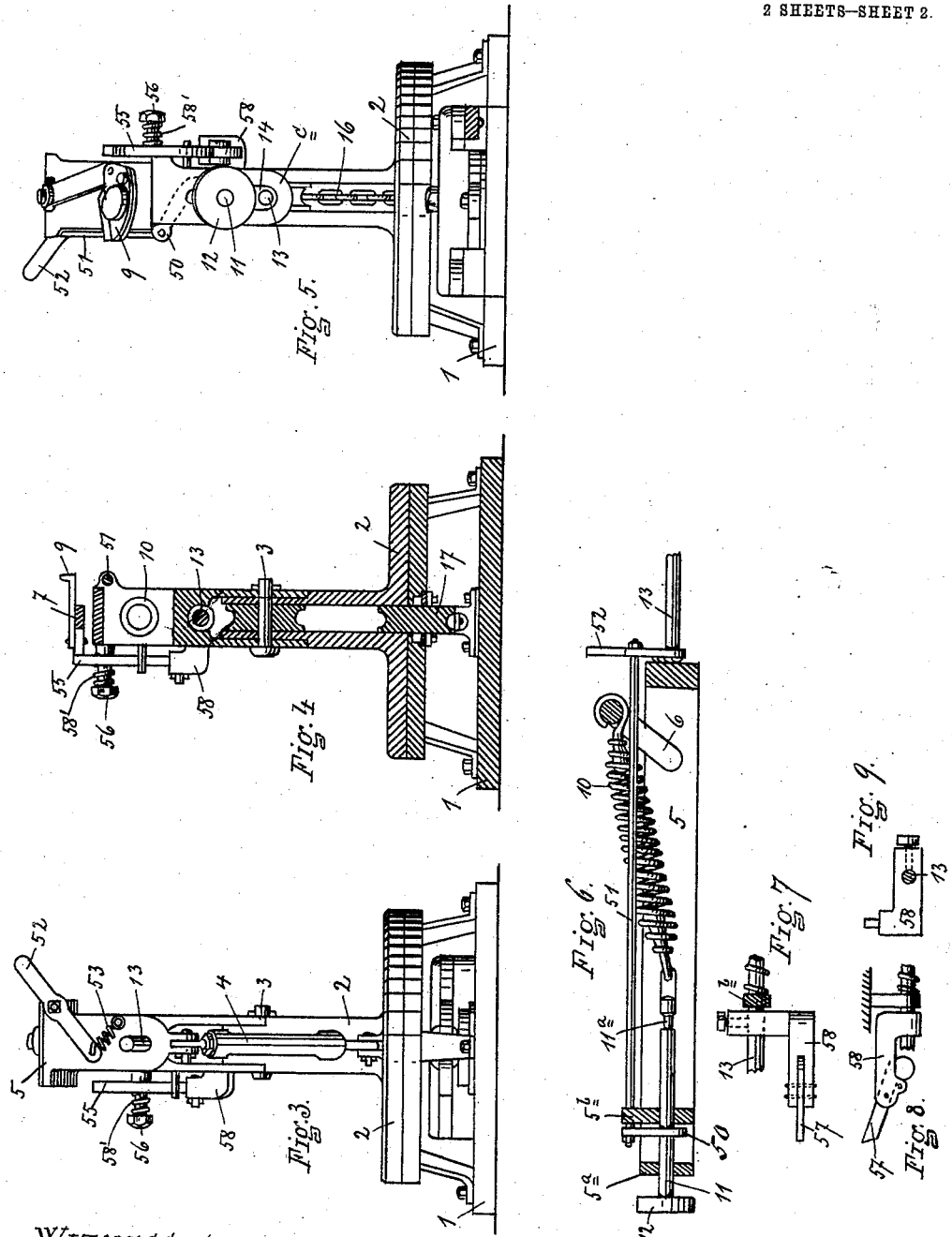

ELIJAH D. FULFORD, OF UTICA, NEW YORK; MATILDA FULFORD, ADMINISTRATRIX OF SAID ELIJAH D. FULFORD, DECEASED, ASSIGNOR TO H. C. LORD, OF ERIE, PENNSYLVANIA.

TARGET-THROWING TRAP.

986,815.  Specification of Letters Patent.  Patented Mar. 14, 1911.

Application filed June 20, 1904, Serial No. 213,229. Renewed June 15, 1908. Serial No. 438,645.

*To all whom it may concern:*

Be it known that I, ELIJAH D. FULFORD, of Utica, in the county of Oneida and State of New York, have invented certain new and useful Improvements in Target-Throwing Traps; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my invention is to provide an improved trap for throwing targets.

In the drawings Figure 1 shows a side elevation of my trap in the set position. Fig. 2 shows a plan view of the same. Fig. 3 is an end view, as seen from the right of Fig. 1. Fig. 4 is a vertical section taken on line A—B of Fig. 1. Fig. 5 is an end view as seen from the left of Fig. 1. Figs. 6, 7, 8 and 9 are detail views of the mechanism and working parts.

Referring to the reference letters and figures in a more particular description, 1 indicates an elongated base, which is preferably provided and on which the mechanism is mounted. The trap proper is mounted on a stand 2 and pivoted thereto at 3, so as to swing in a vertical plane, being adjusted therein by the swivel nut and bolts 4. The trap frame 5 is of an elongated form and has mounted in an upright manner in one end the crank shaft 6. One part of this shaft extends through the upper side of the frame 5 and has attached at its outer end the throwing arm 7. On the arm 7 there is pivoted at 8 the target holder 9. A spring 10 is provided, one end of which is attached to the crank shaft 6 and the other is attached to a sliding bar 11. The bar 11 is provided with a head 12 and a catch shoulder 11$^a$ and is mounted in the end wall 5$^a$ and the cross wall 5$^b$ of the frame, so as to slide freely longitudinally of the frame. Mounted on the under side of the frame 5 in bearings $a$, $b$ and $c$, constituting parts of the frame 5, is the operating bar 13, arranged to slide freely longitudinally of the frame and provided with an end or head 14, adapted to engage with the head 12 of the spring bar 11. A spring 15 is provided on the bar 13 introduced between the bearing $b$ and the collar 13$^a$ secured on the bar 13. A chain 16 is secured to the collar 13$^a$ at one end and passes around a pulley on the pivot 3, and thence around a pulley 17 in the lower portion of the stand and is attached at its other end to the sliding rod 18. The rod 18 is mounted in bearings 19 and 20 on the base 1, and is provided with a conical head 18$^a$. The head 18$^a$ is adapted to be engaged by catch levers 25 and 26, which levers are pivoted at one end to a rocking bar 28 pivoted at 27 on the base 1. The catch levers 25 and 26 engage with the fixed block 29 on the base, and are provided with shoulders 25$^a$ and 25$^b$ adapted to engage with the block 29, and throw off the catch levers 25 and 26 alternately, so as to release the head 18$^a$ of the rod 18. The trap is operated by a lever 40, arranged at or near the shooter's position and connected by a rod 41 with the rocking bar 28. A spring 42 is provided secured at the opposite ends to catch levers 25 and 26 respectively, and operating to draw these levers toward each other and into contact with the operative faces of the block 29, which serves to throw out or disengage the catch end of the levers 25 and 26 respectively. The spring extension rod 11 is adapted to be secured by a catch 50, which engages with the shoulder 11$^a$ on the rod 11, when the spring is placed under full tension. For releasing the catch 50 there is provided a rocking shaft 51, mounted in bearings in the frame 5, and at one end provided with an arm 52, which projects in position to be engaged by the throwing lever 7, as it swings around in throwing the target. A spring 53, between a rearward extension of the arm 52 and the pin on the frame, serves to throw the arm 52 into position to be engaged by the throwing lever 7, and also serves to throw in the catch 50.

On one side of the frame, at the opposite end substantially from the crank shaft 6, there is provided a lever lock 55 pivoted on the frame on an extended pivot 56. This lock is provided with a portion adapted to engage with the throwing lever 7, and secure it in set position. This lock is shown in set position in Fig. 1. For tripping the lock, there is provided a dog 57, counterweighted to hold it in its upper position or engaging position, as shown in Fig. 1, and this dog is mounted on an arm 58 secured on the bar 13. The pivot 56, on which the lock 55 is mounted, as before suggested, is elongated and provided with a spring 58, introduced between the head on the pivot and the side of the lock 55, allowing a limited amount of lateral play to obviate shock when the arm 7 strikes the lock 55.

The trap is adapted to be operated by both the forward and backward movement of the lever 40. Starting with the parts in the position in which they are shown in Figs. 1 and 2, the operator may give the lever 40 a movement toward or from the trap. Supposing that the lever is moved toward the trap, the thrust on the connecting rod 41 causes the lever 28 to swing on its pivot, so as to move the catch 26 toward the trap, in which movement it performs no useful function. At the same time, the catch 25 is moved away from the trap and by reason of its engagement with the head 18ª draws the rod 18 with it, until the tripping shoulders 25ª engage with the block 29, throwing out the catch and releasing the rod 18. As the rod 18 is drawn forward by the catch 25, it draws on the chain connection 16 and serves to slide the bar 13 toward the left as the parts are shown in Fig. 1. As it does so, the dog 57 engages with the lock 55 and rocking it on its pivot releases the lever 7, allowing the lever 7, together with the carrier 9, to be operated by the spring 10, which, at the time, is under tension. It may be noted that when the trap is in set position, as shown in Fig. 1, the crank of the crank shaft 6 stands to one side of the direct line of the spring 10, as shown in Figs. 2 and 6, so that the spring is not operating on the dead center of the crank, but is arranged to swing the arm 7 with the carrier promptly and forcibly. As the arm 7 swings around on the crank shaft as a pivot, the target is delivered from the carrier 9. The momentum of the arm and carrier carries the arm beyond the point where the target is delivered until the arm 7 strikes the trip lever 52. In so doing, the catch 50 is released, allowing the spring extension bar 11 its freedom and it immediately slides to the right from the position shown in Fig. 1 to the position shown in Fig. 6. In so doing, the tension on the spring 10 is released, but still there is momentum sufficient in the arm 7 and the carrier 9 to swing the arm around the circle in position to be again caught by the lock 55. It will be understood that all these operations take place practically instantly and during the whole time the setting bar 13 is making a movement from the right toward the left as the parts are shown in Fig. 1. Thus the end 14 on the bar 13 immediately engages with the head 12 on the spring extension bar 11, and immediately moves it from its right-hand position to its left-hand position, as shown in Fig. 1, where it is again caught by the catch 50. In so doing, the spring 10 is again placed under tension and the trap is set. The carrier 9 is thus always returned promptly to the same position, after every operation, in convenient position to be loaded, and all tendency for the throwing arm to vibrate backward and forward until it comes to a standstill under the tension of the spring is obviated. When the catch 25 has completed its movement and been tripped to release the rod 18, as before mentioned, the rod 18, the chain 16 and the operating bar 13 are all immediately returned to their normal set positions by the operation of the spring 15. In the reverse movement of the lever 40, the swinging cross head 28 is moved in the opposite direction from that heretofore described, and the catch 26 comes into engagement with the head 18ª of the draw rod 18, and serves to operate the same, while the catch 25 is being returned to its position toward the trap, so as to be ready to serve on the next reverse operation of the lever 40.

What I claim as new and desire to secure by Letters Patent is:

1. The combination in a trap operating device of a draw and thrust rod, a rocking arm connected to said rod, catches attached to said rocking arm and arranged to move alternately in opposite directions, a connection to the trap alternately engaged by said catches, and means for throwing said catches out of engagement therewith, substantially as set forth.

2. The combination in a trap operating mechanism of a draw and thrust connection, a pair of catches connected therewith and arranged to operate alternately in opposite direction in connection with the draw and thrust movement of said connection, a connection to the trap with which the catches are arranged to alternately engage, a spring for returning said trap connection to its normal starting position, and means for tripping the catches when they have made their draw movement respectively, substantially as set forth.

3. In a target operating mechanism, the combination of a draw and thrust operating connection 41, a trap connection 18, 16 and a spring for returning the trap connection to its normal or starting position, means for connecting the operative connection 41 with the trap connection 18, 16 on the draw movement of the operative connection 41, and means for throwing out such connecting means and throwing in a movement reversing device 28 and connecting device 25 on the thrust movement, substantially as set forth.

4. In a trap operating mechanism, an operating lever, a connection between the lever and trap, including means for operating the trap in connection with both the forward and backward movements of the lever, substantially as set forth.

5. In a trap operating mechanism, a connection extending from a removed point to the trap, including a driving part 41 and a driven part 18, means for connecting the two parts directly on the movement in one direction of the driving part, and means for reversing the movement and connecting the parts through the reversing mechanism during the other movement of the driving part, substantially as set forth.

6. The combination in a target throwing trap of a throwing arm mounted on a pivot to describe a circle; a crank connected and rotating with the throwing arm; a spring attached to the crank, means for placing the spring under tension; and means for automatically releasing the spring while the throwing arm is in motion substantially as set forth.

7. The combination in a target throwing trap of a throwing arm mounted on a pivot to describe a circle; a crank connected and rotating with the throwing arm; a spring attached to the crank, means for placing the spring under tension; a device for securing the spring under tension; a catch for securing the throwing arm in set position; and means for automatically releasing the spring securing device while the throwing arm is in motion substantially as set forth.

8. The combination of a target throwing trap of a frame; a swinging throwing arm pivoted on the frame and arranged to make revolution around the pivot and to starting position; a spring for operating the arm in the throwing movement; a catch for securing the arm in its set position; means for placing throwing spring under tension, a catch for securing the throwing spring under tension; and a trip for the said catch arranged to be operated from the throwing arm when in its returning movement whereby the throwing spring becomes inert, substantially as set forth.

9. A combination in a target throwing trap of a frame, a throwing arm pivoted thereon and arranged to make a revolution around the pivot and thereby return to starting position; a crank attached to said arm; a throwing spring attached to said crank at one end and adjustably connected to the frame at the other end; means operating upon the adjustable end of the spring for placing the spring under tension; a catch for securing the throwing spring under tension, means for tripping said catch when the arm is in its returning movement whereby the throwing spring becomes inert after the throwing arm has started in its return movement; and a catch for securing the throwing arm in its set or starting position, substantially as set forth.

10. A combination in a target throwing trap of a frame; a throwing arm and crank pivoted on the frame and arranged to make a revolution around the pivot and thereby return to starting position, which revolution will carry the crank to opposite sides of the pivot; a throwing spring attached at one end to the crank and adjustably connected at the other with the frame; means for placing the throwing spring under tension operating upon the frame connected end of said spring, the arrangement of spring and crank being such that prior to passing the dead center the spring will act to accelerate the speed of the throwing arm and after the crank passing the dead center to check the arm; a catch for securing the spring under tension; a tripping device connection between the throwing arm and the spring securing catch arranged to trip and release the catch during the returning movement of the throwing arm; and a catch for securing the throwing arm in set position substantially as set forth.

11. In a target throwing trap, the combination of a frame; a throw arm pivotally mounted thereon for complete rotation; a crank connected and rotating with the throwing arm; and means acting upon the crank for automatically actuating the arm and to stop and start the same, and to make a complete rotation at each operation with a continuous movement and with uniform acceleration and retardation.

12. In a target throwing trap, the combination of a frame; a throw arm pivotally mounted thereon for complete rotation; a crank connected and rotating with the arm; a latch for retaining the throw arm in set position; and means acting upon the crank for automatically actuating the arm upon the movement of the latch and to make a complete rotation at each operation, and to move the arm in a complete circle from the latch to the latch with a continuous movement and with uniform acceleration and retardation.

13. In a target throwing trap, the combination of a frame; an arm pivotally mounted thereon for complete rotation; a spring for actuating the arm to throw the target; and means for automatically releasing the spring during the movement of the arm to permit its return under the influence of inertia to set position.

14. In a target throwing trap, the combination of a frame; a throw arm pivotally mounted for complete rotation thereon; and automatic means for releasing the spring during the movement of the arm to permit its return to set position.

15. In a target throwing trap, the combination of a frame; a throw arm pivotally mounted for complete rotation thereon; and automatic means for releasing the spring during the movement of the arm to permit its return under the influence of its inertia to set position.

16. In a target throwing trap, the combination of a frame; a throw arm pivotally mounted thereon for complete rotation; a spring having one end operatively connected with the arm, and a movable anchor connected with the opposite end; and automatic means for releasing the anchor during the movement of the arm.

17. In a target throwing trap, the combination of a frame; a throw arm pivotally mounted thereon for complete rotation; a spring having one end operatively connected with the arm, a movable anchor connected with the opposite end; and automatic means for releasing the anchor to permit its return of the arm under the influence of its inertia to said position.

18. In a target throwing trap, the combination of a frame; a throw arm pivotally mounted therein for complete rotation; a spring having one end operatively connected with the arm; a movable anchor connected with the opposite end of the spring; automatic means for releasing the anchor during the movement of the arm; a pull mechanism for resetting the anchor; and means independent of the pull mechanism for holding the anchor in set position.

19. In a target throwing trap, the combination of a frame; a throw arm pivotally mounted therein for complete rotation; a spring having one end operatively connected with the arm; a movable anchor connected with the opposite end of the spring; automatic means for releasing the anchor during the movement of the arm; a pull mechanism for resetting the anchor; means independent of the pull mechanism for holding the anchor in set position; a latch for holding said throw arm in set position; and means actuated by the pull mechanism for actuating said latch.

20. In a target throwing trap, the combination of a frame; a throw arm pivotally mounted therein for complete rotation; a crank rigidly connected and rotating with said arm; a spring acting upon said crank for actuating the arm to throw the target; and devices acting with the arm and the spring for automatically resetting the arm with the energy of the spring.

21. In a target throwing trap, the combination of a frame; a throw arm pivotally mounted therein for complete rotation; a crank rigidly connected and rotating with the said arm; a spring acting upon said crank for actuating the arm to throw the target; and devices acting with the arm and the spring for automatically resetting the arm with the initial energy of the spring when the trap is sprung.

22. In a target throwing trap, the combination of a frame; a throw arm pivotally mounted therein for complete rotation; a spring for operating the throw arm; a movable anchor for the spring; means for releasing the anchor to permit the resetting of the arm; a pull mechanism for operating upon the anchor to reset the spring; and means for holding the anchor in set position independently of the pull mechanism.

23. In a target throwing trap, the combination of a frame; a throw arm pivotally mounted therein for complete rotation; a spring for actuating the throw arm; a movable anchor for the spring; pull actuated devices acting on the anchor for resetting the spring; and means independent of the pull for locking the anchor in set position.

In witness whereof, I have affixed my signature, in presence of two witnesses, this 11th day of June 1904.

E. D. FULFORD.

Witnesses:
WM. C. ROBINSON,
EMMA S. HESSE.

---

Copies of this patent may be obtained for five cents each, by addressing the "Commissioner of Patents, Washington, D. C."